United States Patent [19]

Arhart et al.

[11] 4,177,223

[45] Dec. 4, 1979

[54] PRESS-CURABLE FLUOROPOLYMER COMPOSITIONS AND PROCESS

[75] Inventors: Richard J. Arhart; Arthur Nersasian, both of Wilmington, Del.

[73] Assignee: E. I. Du Pont de Nemours and Company, Wilmington, Del.

[21] Appl. No.: 864,606

[22] Filed: Dec. 27, 1977

[51] Int. Cl.$^2$ .......................... C08F 8/00; C08F 14/22
[52] U.S. Cl. .................................... 525/331; 252/430; 526/30; 525/362; 525/363; 525/367; 525/368; 525/343; 525/362; 525/363; 525/367; 525/368; 525/373; 525/200, 260/884
[58] Field of Search .................. 260/47 UA, 900, 884; 526/254, 18, 46, 55, 30, 47.3, 47.8

[56] References Cited

U.S. PATENT DOCUMENTS

| | | | |
|---|---|---|---|
| 2,647,882 | 8/1952 | Evans et al. | 260/47 UA |
| 3,600,404 | 8/1971 | Ludwig | 260/345.9 |
| 3,660,331 | 5/1972 | Ludwig | 260/23 XA |
| 3,876,654 | 4/1975 | Pattison | 260/47 UA |
| 3,884,877 | 5/1975 | Kolb | 260/47 UA |
| 3,951,913 | 4/1976 | Kometani et al. | 260/47 UA |

OTHER PUBLICATIONS

Fieser and Fieser, Reagents for Organic Synthesis, John Wiley & Sons (1968), pp. 256-257.

*Primary Examiner*—Harry Wong, Jr.

[57] ABSTRACT

Copolymers of vinylidene fluoride with at least one other fluorinated- ethylenically unsaturated monomer are press-cured at about 163°-204° C. by crosslinking with an aromatic polyhydroxy compound in the presence of an accelerator in a weakly basic system, at least a portion of the polyhydroxy compound being blocked by conversion to acetal or thioacetal groups. At the press-cure temperature some of the acetal or thioacetal groups are decomposed and the free hydroxyl groups are reformed, thus providing crosslinking capability. The remainder of acetal or thioacetal groups are decomposed during post-cure oven heating at a higher temperature, and under those conditions copolymer vulcanization is completed. Press-cured compositions of this invention have excellent hot tensile elongation, which permits easy demoldability; and very good recyclability, which eliminates or reduces fluoropolymer waste. The compositions of this invention also have excellent mold flow properties at press-cure temperature.

17 Claims, 1 Drawing Figure

PRESS-CURABLE FLUOROPOLYMER COMPOSITIONS AND PROCESS

BACKGROUND OF THE INVENTION

This invention relates to vulcanizable fluoroelastomer compositions exceptionally well suited for molding intricately shaped articles and readily recyclable even after press-curing.

Many fluoroelastomers have achieved commercial success in such applications as, for example, gaskets, seals, diaphragms, and tubing, where high temperature resistance and chemical inertness are required. Such articles are formed by various techniques well known in the polymer fabrication art, including extrusion, injection molding, and transfer molding. The elastomer composition must be fluid enough at the operating temperature to flow evenly into the mold or through a die, but it must be sufficiently cured by the time it leaves the forming equipment to maintain its shape during subsequent handling, including actual demolding. It also must be sufficiently strong to withstand demolding without tearing. If the degree of cure in the forming equipment (sometimes referred to as the "press-cure") is high, sufficient flow may not be achieved, and the fabricated articles are imperfect. This is particularly true for short press-cure cycles.

Another problem associated with a high press-cure is the difficulty of recycling the flashings and scrap elastomer. While a fair proportion of fabricated articles will be imperfect, they cannot be readily recycled, thus adding to the cost of the commercially acceptable articles produced in those operations.

Vinylidene fluoride copolymers with other ethylenically unsaturated fluorinated monomers can be cured by crosslinking with aromatic polyhydroxy compounds in the presence of accelerators and of divalent metal oxides or hydroxides. The accelerators usually are quaternary phosphonium, arsonium, or stibonium compounds, as described in U.S. Pat. No. 3,876,654 to Pattison, but can also be quaternary ammonium compounds, as shown by U.S. Pat. No. 3,988,502 to Patel et al; substituted guanidines or amidines recited in U.S. Pat. No. 3,686,143 to Bowman; or cyclic polyethers taught in U.S. Pat. No. 3,580,889 to Barney et al. The teachings of those patents are incorporated herein by reference.

It is highly desirable to provide an improved process and compositions which would produce a low but satisfactory degree of cure in the press cycle.

SUMMARY OF THE INVENTION

According to the present invention, there is now provided an improvement in a process for vulcanizing a vinylidene fluoride copolymer with at least one other fluorinated, ethylenically unsaturated monomer by crosslinking with an aromatic polyhydroxy compound in the presence of an accelerator in a weakly basic system at about 163°–204° C., the improvement consisting in that the hydroxyl groups of at least a portion of the crosslinking compound are first blocked by acid-catalyzed conversion to acetal or thioacetal groups, the blocking agent having the following formula (1):

wherein

Z is O or S;

$R^1$ can be hydrogen; such of $R^1$ and $R^2$ independently can be a $C_1$–$C_{18}$ alkyl, phenyl or substituted phenyl, a $C_5$–$C_7$ cycloalkyl or substituted cycloalkyl, a $C_3$–$C_8$ alkenyl, a $C_3$–$C_8$ alkynyl, or a $C_5$–$C_7$ cycloalkenyl;

the phenyl or cycloalkyl substituents being $C_1$–$C_6$ alkyl, halogen, or $C_1$–$C_6$ alkoxy groups; or $R^1$ and $R^2$ can be joined together, the above compound of formula (1) being a ring having 5–7 members, which may be unsubstituted or substituted; any ring substituents being selected from the same groups as those used above for $R^1$ and $R^2$ other than hydrogen; with the proviso that when $R^1$ and $R^2$ are not joined together, Z can only be O.

There also is provided a vulcanizable fluoroelastomer composition containing as its essential components:

(A) a copolymer of vinylidene fluoride with at least one other ethylenically unsaturated fluoromonomer, (B) an accelerator effective in promoting the crosslinking of copolymer (A) with an aromatic polyhydroxy compound in a weakly basic system, (C) a substance selected from the groups of divalent metal oxides, divalent metal hydroxides, and a mixture of such oxides or hydroxides with metal salts of weak acids, and (D) an acetal or thioacetal obtained by an acid catalyzed reaction of an appropriate vinyl ether or thioether with a polyhydroxylic aromatic compound effective to crosslink copolymer (A) when all aromatic hydroxyl groups are free, selected from the group of di-, tri-, and tetrahydroxybenzenes, -napthalenes, and -anthracenes; and bisphenols; all the above compounds being unsubstituted or substituted with chloride, bromine, fluorine, carboxyl, or acyl; and 2,4-dihydroxybenzophenone;

the vinyl ether or thioether having the following formula (1).

wherein

Z is O or S;

$R^1$ can be hydrogen; each of $R^1$ and $R^2$ independently can be a $C_1$–$C_{18}$ alkyl, phenyl or substituted phenyl, a $C_5$–$C_7$ cycloalkyl or substituted cycloalkyl, a $C_3$–$C_8$ alkenyl, a $C_3$–$C_8$ alkynyl, or a $C_5$–$C_7$ cycloalkenyl;

the phenyl or cycloalkyl substituents being $C_1$–$C_6$ alkyl, halogen, or $C_1$–$C_6$ alkoxy groups; or $R^1$ and $R^2$ can be joined together, the above compound of formula (1) being a ring having 5–7 members, which may be unsubstituted or substituted; any ring substituents being selected from the same groups as those listed above for $R^1$ and $R^2$ other than hydrogen; with the proviso that when $R^1$ and $R^2$ are not joined together, Z can only be O.

DETAILED DESCRIPTION OF THE INVENTION

Any highly fluorinated elastomer which can be cured by prior art methods to useful products can be used as the starting material in the process of this invention. Often such elastomers are dipolymers of vinylidene fluoride with perhalogenated monomers, such as hexafluoropropene, chlorotrifluoroethylene, dichlorodifluoroethylene, and trichlorofluoroethylene or terpolymers of vinylidene fluoride with two fluorinated monomers, for example with hexafluoropropene, and tetrafluoroethylene. For good elastic properties, such copolymers should have a random distribution of their monomer units. The preferred starting material is vinylidene fluoride/hexafluoropropene copolymer in which these two monomers are combined in a mole ratio of 85:15 to 50:50. Highly fluorinated copolymers are well known in the art and many are commercially available under such trade names as "Viton" (Du Pont), and "Fluorel" (Minnesota Mining and Manufacturing Co.). The following U.S. Pat. Nos. describe some suitable fluoropolymers: 3,051,677 (Rexford); 2,968,649 (Pailthorp & Schroeder; 2,738,343 (Dittman et al); 2,752,331 (Dittman et al); 2,468,664 (Hanford & Roland); 2,292,967 (Brubaker); 2,833,572 and 2,965,619 (both to Honn et al).

The quaternary accelerators that can be used to make the compositions of the present invention can be represented by Formula (2), wherein Q is N, P, As, or Sb; and $R^4$, $R^5$, $R^6$, and $R^7$ are selected individually from the group: $C_1-C_{20}$ alkyl, aryl, aralkyl, alkenyl, and the chlorine, fluorine, bromine, cyano, —OR, and —COOR substituted analogs thereof, R being selected from the group $C_1-C_{20}$ alkyl, aryl, aralkyl, and alkenyl; and X is selected from the group: halide, sulfate, sulfite, carbonate, pentachlorothiophenolate, tetrafluoroborate, hexafluorosilicate, hexafluorophosphate, dimethyl phosphate, and $C_1-C_{20}$ alkyl-, aryl-, aralkyl-, and alkenyl carboxylate and dicarboxylate; n is 1 or 2 and equal to the valence of the anion X.

The pentasubstituted guanidines suitable as vulcanization accelerators have on each nitrogen atom a substituent which can be independently of other such substituents an alkyl, cycloalkyl, aralkyl, or aryl radical of 1-20 carbon atoms; but no more than two radicals are aryl radicals, and any two radicals can be joined together to form a ring structure. A salt of such guanidine with an organic or inorganic acid also can be used.

The trisubstituted amidines have hydrocarbon radicals attached to each of the three nitrogen atoms as well as to the carbon atom, each hydrocarbon radical independently being an alkyl, cycloalkyl, or aralkyl group of 1-20 carbon atoms, and any two such substituents can be joined together to form a ring structure.

The cyclic polyethers useful as accelerators in this invention contain about 4-10 —O—X— units —O—Y— units, wherein X and Y are divalent radicals independently selected from the group consisting of and wherein R is H or $CH_3$, and at least one of X and Y is (3). These cyclic polyethers also are known as "crown" compounds and are described in U.S. Pat. Nos. 3,562,295 and 3,687,978 to Pedersen.

The weakly basic system is obtained by incorporating into the compositions of the present invention divalent metal oxides or hydroxides, such as, for example, magnesium oxide, zinc oxide, calcium oxide, or lead oxide, or a divalent metal hydroxide; or a mixture of the oxide and hydroxide; or a mixture of the oxide and/or hydroxide with a metal salt of a weak acid, for example a mixture containing about 1–70% by weight of the metal salt. Among the useful metal salts of weak acids are barium, sodium, potassium, lead, and calcium stearate, benzonate, carbonate, oxalate and phosphate. Known fillers, pigments and other additives can also be present in the composition. The amount of the metal compound added generally is about 1–15 parts by weight per 100 parts of fluoroelastomer, about 2–6 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound. When a metal oxide is used, it can be compounded with a fluoroelastomer stock either in the free state or as a metal oxide complex or chelate with organic complexing agents and ligands, such as cyclic polyethers, amines, phosphines, ketones, alcohols, phenols, or carboxylic acids.

Among the many polyhydroxylic aromatic compounds from which the blocked crosslinking agents of this invention are made, the preferred compounds are hydroquinone, 2,4-dihydroxybenzophenone, bisphenol A and bisphenol AF, which is p,p'-hexafluoropropylidenediphenol.

The vinyl ethers and thioethers of the present invention include, for example, dihydropyran, dihydrofuran, dihydrothiapyran, dihydrothiophene, both unsubstituted and substituted; and alkyl vinyl ethers such as n-butyl vinyl ether, methyl 1-propenyl ether, and methyl 1-butenyl ether. Many of these ethers and thioethers can be obtained in commerce, and others can be prepared according to known methods of synthetic organic chemistry.

The preparation of acetals or thioacetals from the polyhydroxylic aromatic compounds and the vinyl ethers or thioethers can be readily accomplished following the known methods for making acetals from aldehydes and alcohols. For example, bisphenol AF blocked with dihydropyran, (6), is made by adding bisphenol AF to an excess of dihydropyran containing a trace of hydrochloric acid. This reaction can be illustrated by the following equation:

The above compound (6) is the bis(tetrahydropyranyl) ether of bisphenol AF.

A reaction of the type illustrated by the above equation can be carried out either without a solvent or in a suitable organic solvent, such as, for example, methylene chloride or acetone. The degree of conversion of polyhydroxy compound to acetal or thioacetal depends, among others, on the respective mole ratios of the reactants. Quantitative conversion is usually obtained when the mole ratio of vinyl ether or thioether to dihydroxy compound is at least 2.8:1, although it is preferred to employ these reactants in a 4:1 mole ratio. However, even when equimolar amounts of the reactants are used, some completely blocked material will be formed together with some monoderivative, and some unchanged dihydroxy compound will remain. Accordingly, when less blocking agent than required for complete reaction is used, mixtures of two or three compounds usually result. Use of a solvent is particularly advisable when only a small proportion of liquid vinyl ether or thioether is used in the reaction. Free di- or polyhydroxy compound may sometimes be left in the mixture or it can be removed by washing a solution of crude reaction product with dilute aqueous alkali. The monosubstituted derivative normally is not removed by such a treatment. The order of addition of the reactants to each other does not appear to affect the chemical nature or purity of the product.

Work-up and purification of certain blocked polyhydroxy compounds can be quite difficult and tedious. For example, the bis(tetrahydropyranyl) ether of bisphenol AF is difficult to recrystallize but can be, if desired, taken up on a solid carrier, such as, for example, calcium hydroxide, magnesium oxide, calcium carbonate, or hydrous calcium silicate. n-Butyl vinyl ether-blocked hydroquinone, which is a liquid, can be taken up on hydrous calcium silicate. These adsorbed preparations are free-flowing, easily handled powders, which contain about 33–70% of the blocked bisphenol.

Other typical carriers which are useful in the present invention are aluminum and magnesium silicate, magnesium carbonate, barium sulfate, diatomaceous earth, and kaolin clay. These carriers also can support about 33—70% of the various blocked aromatic polyhydroxy compounds of this invention. It is desirable that solid carriers have high adsorption capabilities, be non-acidic and do not adversely affect vulcanizate properties. According to these criteria, calcium hydroxide, magnesium oxide and especially hydrous calcium silicate are the preferred carriers. Adsorption of the blocked polyhydroxy compounds on carriers, particularly on hydrous calcium silicate, also reduces the odor which sometimes is given off by some of the crude materials. Purification, for example, by recrystallization, produces the same result.

A blocked aromatic polyhydroxy compound can be dispersed in a fluoroelastomer polymer in amounts up to about 50% by weight of the total resulting dispersion by mixing on a two-roll mill or in an internal mixer, such as a Banbury. About 2% by weight of a processing aid, such as Du Pont's VPA No. 2® (natural vegetable wax) improves mixing by reducing sticking to processing equipment. Such dispersions of blocked curing agent in fluoropolymer can be used in the process of the present invention, in lieu of blocked curing agent alone and are more readily blended with fluoroelastomer which is to be press-cured than the blocked curing agent alone.

The acetals and thioacetals of this invention are, like any other acetals, stable in a basic medium but unstable in an acidic medium. At elevated temperatures, these compounds decompose, reforming the starting polyhydroxy compounds, which then can perform their crosslinking functions. Since the fluoropolymers employed in the process and compositions of the present invention also are slightly thermally unstable in unvulcanized state, there is always formed at elevated temperatures a minor amount of hydrogen fluoride or hydrogen chloride, which catalyzes partial thermal decomposition of the blocked polyhydroxy compounds. Some unblocked polyhydroxy compound will be formed within the temperature range of about 163°–204° C., which is the usual operating range of fluoroelastomer-fabricating equipment. In spite of the fact that a basic material is present in the compositions of the instant invention, there is formed a sufficient amount of hydrogen halide to cause this thermal decomposition of blocked crosslinking agents. While the optimum operating temperature will vary somewhat from one blocked vulcanizing agent to another, it has been found that best results are obtained with the bis(tetrahydropyranyl) ether of bisphenol AF (6) at a temperature of about 177° C. In any event, the temperature should not exceed about 204° C. because the unblocking reaction at higher temperatures is so extensive that a high degree of polymer vulcanization would be obtained. This, of course, would defeat the purpose of this invention. At temperatures below about 163° C., the unblocking is so negligible that a sufficient degree of polymer vulcanization cannot be achieved. Ideally, polymer leaving the fabricating equipment should have sufficient strength and integrity to resist damage and loss of shape in normal handling, but it should not be completely cured.

The degree of cure of any given elastomer can be determined by the well known ODR technique employing an oscillating disc rheometer. The test measures indirectly elastomer viscosity by the amount of torque required to oscillate the disc. A very useful aspect of the present invention is the broad range of cure levels that can be obtained by using a mixture of unblocked and blocked polyhydroxy compounds, the relative proportions of these materials being varied at will to obtain the desired torque by the ODR method.

Figure 1:
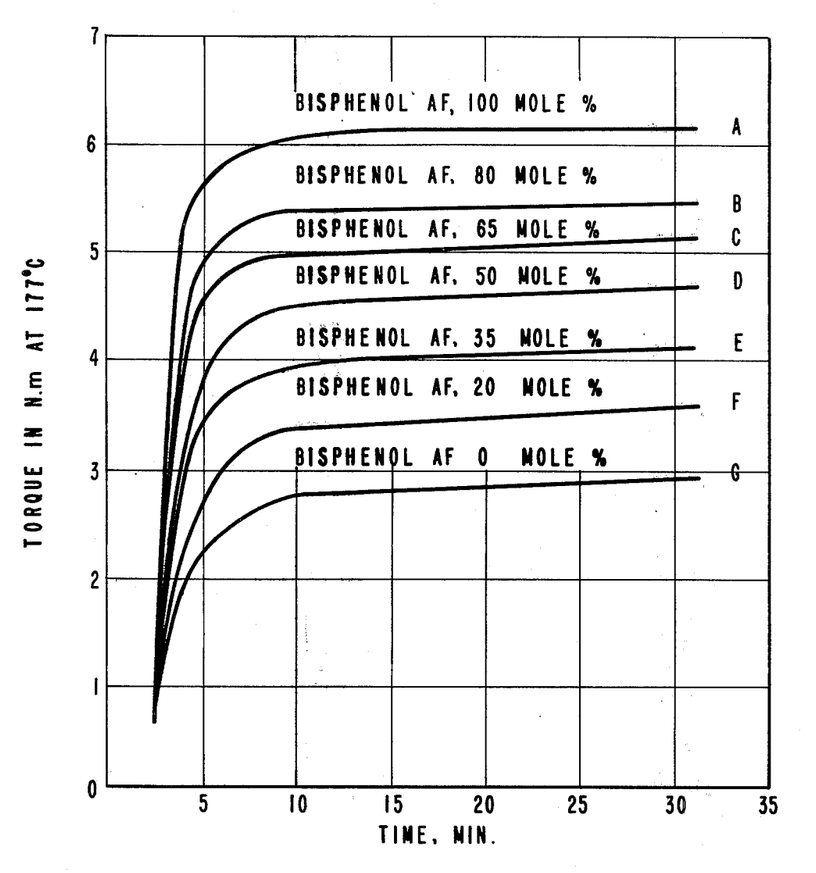
The drawing is a plot of torque versus time obtained by the Oscillating Disc Rheometer method for a typical fluoroelastomer composition of the present invention.

The Drawing represents a typical plot of torque versus time obtained by the ODR method at the usual presscure temperature of 177° C. for a representative fluoroelastomer with unblocked bisphenol AF (curve A), with bis(tetrahydropyranyl) ether of bisphenol AF (curve G), and with mixtures of these two compounds in varying proportions (curves B-F). The mole percent of free bisphenol AF is given for each ODR curve. The mole percent of blocked bisphenol AF is for each curve the difference between 100% and the figure given for free bisphenol AF. While the torque initially increases very rapidly, it reaches in less than 10 minutes a plateau, wherein the torque values continue to increase but at a very slow rate. It can be seen that the amount of cure obtained with the bis(tetrahydropyranyl) ether alone is quite low, while with free bisphenol AF it is more than twice as high. Intermediate torque values are obtained for their mixtures.

The blocked aromatic polyhydroxy compounds used in the compositions of the present invention are strong Lewis bases, which give scorchy elastomer stocks in standard vulcanization recipes. To increase processing safety, it is preferred to decrease the proportions of the accelerator and of the basic metal compound below the respective levels of those compounds in prior art vulcanizable fluoroelastomer compositions. For example, when the basic metal compound is calcium hydroxide, and the accelerator is benzyltriphenylphosphonium chloride, the proportion of each of these components should be reduced by about 33–50% of their proportions in prior art compositions, the level of calcium hydroxide being about 0.5–10 phr and that of benzyltriphenylphosphonium chloride being about 0.05–2 phr.

The press-cured articles normally are not suitable for their intended end use without additional post-cure, which can be achieved, for example, by heating the presscured articles in an oven at about 225°–235° C. for about 15 hours or longer. The post-cure is necessary even in the case of the prior art compositions based on unblocked aromatic polyhydroxy compounds, so that no additional steps are required by the present process.

One of the advantages of the present invention is the better mold flow of the vulcanizable fluoroelastomer compositions contemplated by it. Mold flow can be determined, for example, by transfer molding an elastomer composition for a desired period, for example, 10 seconds, at a given temperature, for example, 177° C., and under constant pressure through an orifice having a desired size. An elastomer composition having better flow properties will fill the mold more completely at a given pressure or will require a lower pressure to fill the mold completely than a composition having lower flowability at the same temperature.

Another advantage of this invention is the easy recyclability of flashing or waste material. Because of the low state of cure after press-cure, this material can be sheeted on a mill, blended with virgin fluoroelastomer, and reused in fabricating end products. While normally about 10 weight percent of recycled elastomer is used in the blend, proportions as high as 30 weight percent have been successfully fabricated.

A further advantage of this invention is the high hot tensile elongation of press-cured vulcanizable fluoroelastomer compositions of the present invention. Experience has shown that stocks having high elongation at molding temperatures are more easily demolded hot without tearing than those having low elongation. The press-cured fluoroelastomer stocks of this invention can thus be demolded hot without damaging the molded article. This is an important improvement because articles molded from some prior art vulcanizable fluoroelastomer stocks could not be readily demolded without considerable risk of damage due to tear, so that the rate of product rejection was high.

This invention is now illustrated by the following examples of certain representative embodiments thereof, where all parts, proportions, and percentages are by weight unless otherwise indicated.

ODR determinations in Examples 4, 7, 8, 10, 11, 13, 14, and 15 were made according to ASTM procedure D-2084, using a micro-die.

The determinations in Examples 5, 6, and 12 were made according to a modified procedure using Model L-S Rheometer in "LS" mode, wherein the test temperature was 177° C., arc 3°, range 0–22.6 N.m, frequency of oscillation 3 c.p.m., chart time motor speed 30 minutes, and preheat time 1 minute.

EXAMPLE 1

Preparation of bis(tetrahydropyranyl) ether of Bisphenol AF

To 109.5 ml (1.2 mole) of 3,4-dihydro-2H-pyran (commonly called dihydropyran) under nitrogen were added 3 drops of concentrated (37.3%) hydrochloric acid and then 100.8 g (0.3 mole) of air-milled bisphenol AF over 4.5 minutes with stirring. The reaction mixture darkened immediately and the temperature increased from 21.5° C. to a maximum of 64° C. after 11 minutes. After stirring a total of 2 hours from the start of the addition, the reaction mixture temperature had cooled to 23° C. The viscous, brown mixture was allowed to stand overnight and then was dissolved in 600 ml of methylene chloride and extracted twice with 600 ml of 10% aqueous potassium hydroxide and once with 600 ml of water. The methylene chloride layer was dried over anhydrous sodium sulfate, filtered, and evaporated to dryness at reduced pressure. After drying overnight in an 80° C. vacuum oven, light brown solid product melting at 60°–100° C. was obtained in a 98.1% yield.

Purification by recrystallization from acetone/petroleum ether gave two crops of crystals: the first was a white solid melting at 136°–139° C., obtained in a 21.8% yield, and the second was an off-white solid melting at 130°–137° C., obtained in a 22.0% yield (total yield, 43.8% based on starting materials). The first batch gave the following elemental analysis: found; %C, 59.5; %H, 5.1. Theory; %C, 59.7; %H, 5.2. An nmr integration confirmed the expected structure.

Other acid catalysts have been used successfully, for example, concentrated sulfuric and p-toluenesulfonic acids, but hydrochloric acid is preferred. Concentrated sulfuric acid catalysis resulted in extremely exothermic reactions.

Alternative Purification Technique

A suitable work-up procedure for the crude reaction product is neutralization of acid catalyst with a slight excess of base, such as calcium hydroxide. The product however, is a sticky, semi-solid. It can be dissolved in solvent and taken-up on several solid carriers, as explained above. Hydrous calcium silicate is preferred because of its excellent absorption ability (only 30 wt. % is required) and its inertness (no effect on vulcanizate properties). In addition, it is sufficiently basic to require no prior addition of base to neutralize the acid catalyst.

EXAMPLE 2

Bis(tetrahydropyranyl) ether of Hydroquinone

To 73.0 ml (0.8 mole) dihydropyran warmed to 45° C. and under nitrogen were added 2 drops of concentrated (37.3%) hydrochloric acid and then 22.0 g (0.2 mole) of hydroquinone over 3.0 minutes with stirring. The reaction temperature increased to a maximum of 90° C. after 5 minutes at which time the external heat was turned off. On cooling to 50° C., a slightly pink-colored solid formed. After one hour and 50 minutes from the start of the addition, 0.2 g calcium hydroxide was added to the reaction slurry, which was stirred 5 minutes and then concentrated under reduced pressure. After drying 1½ days in an 80° C. vacuum oven, tan, free-flowing solid product melting at 119°–129° C. (preceeded by softening) was obtained in a 95.5% yield. Crude product may also be isolated by suction filtration of the calcium hydroxide-containing slurry. In this case an off-white, free-flowing solid product melting at 97°–120° C. (preceeded by softening) was obtained in 86.0% yield.

Purification by recrystallization from acetone/petroleum ether gave a white solid melting at 128°–132° C. (preceeded by slight softening). Although recrystallization here is rapid and facile compared to that for the bisphenol AF derivative, yield losses are substantial.

Since the crude product is a free-flowing, easily handled solid, take-up on a solid carrier is not required. However, it is practical to absorb the crude product on a carrier, such as hydrous calcium silicate, to reduce the odor sometimes given off by the crude material when it is prepared from unpurified dihydropyran.

EXAMPLE 3 n-Butyl Vinyl Ether-Blocked Hydroquinone

To 104 ml (0.8 mole) of n-butyl vinyl ether under nitrogen were added 2 drops of concentrated hydrochloric acid and then 22.0 g (0.2 mole) of hydroquinone over 4 minutes with stirring. On heating, the hydroquinone dissolved and reacted, as seen from spontaneous temperature rise. When the reaction temperature reached 105° C., the external heat was turned off. After stirring a total of 2 hours from the start of the addition, the reaction mixture temperature had cooled to 28° C. Calcium hydroxide (0.1 g) was added to the clear solution, followed by 100 ml acetone, and finally 26.7 g hydrous calcium silicate. The resulting slurry was concentrated under reduced pressure and dried further for 1 day each in 80° C. and 100° C. vacuum ovens. The product, which consisted of 70 wt. % active ingredient on 30 wt. % hydrous calcium silicate ("Micro-Cel E"), was an off-white, free-flowing solid obtained in a 92.4% yield.

EXAMPLE 4

Press-Cure of a Fluoroelastomer

Vulcanizable elastomer compositions were prepared as follows: crosslinking agent and benzyltriphenylphosphonium chloride accelerator were added to a broad molecular weight copolymer of 60 weight percent of vinylidene fluoride and 40 weight percent of hexafluoropropene on a 2-roll mill. This addition was followed by the addition of a mixture of the remaining ingredients. This order of addition is recommended; when it is reversed by adding crosslinking agent last, lower ODR values were obtained. The crosslinking agent was based on bisphenol AF, either completely unblocked, completely blocked with dihydropyran, or as a mixture of the free and blocked curing agent. Blocked bisphenol AF was adsorbed on hydrous calcium silicate, Micro-Cel E ®, carrier (30% support, 70% active material).

TABLE I (Compounding)

| Component | Run A | B | C | D | E | F | G |
|---|---|---|---|---|---|---|---|
| Elastomer | 100 | 100 | 100 | 100 | 100 | 100 | 100 |
| MT Black | 30 | 30 | 30 | 30 | 30 | 30 | 30 |
| Maglite D[1] | 3 | 3 | 3 | 3 | 3 | 3 | 3 |
| Ca(OH)$_2$ | 6 | 5.53 | 5.18 | 4.83 | 4.48 | 4.13 | 3.67 |
| Accelerator | 0.6 | 0.55 | 0.52 | 0.49 | 0.45 | 0.41 | 0.37 |
| Free bisphenol AF | 2.0 | 1.6 | 1.30 | 1.00 | 0.70 | 0.40 | — |
| Blocked bisphenol AF[2] | — | 0.86 | 1.50 | 2.14 | 2.79 | 3.43 | 4.29 |
| Mole % free bisphenol AF | 100 | 80 | 65 | 50 | 35 | 20 | — |
| mmol free bisphenol AF | 6 | 4.8 | 3.9 | 3.0 | 2.1 | 1.2 | — |

[1]magnesium oxide
[2]includes the weight of carrier.

The compounded elastomer stocks were tested by the Oscillating Disc Rheometer technique. The test was run for 30 minutes at 177° C. The ODR torque data (in N.m) are given in Table II.

TABLE II

ODR Torque Values (N.m)

| Time (min.) | Run A | B | C | D | E | F | G |
|---|---|---|---|---|---|---|---|
| 2.5 | 0.79 | 0.79 | 0.90 | 0.68 | 0.90 | 0.79 | 0.79 |
| 5.0 | 5.76 | 4.97 | 4.63 | 3.84 | 3.50 | 2.71 | 2.26 |
| 7.5 | 5.99 | 5.20 | 4.97 | 4.41 | 3.84 | 3.28 | 2.60 |
| 10 | 6.10 | 5.42 | 4.97 | 4.52 | 3.95 | 3.39 | 2.71 |
| 15 | 6.21 | 5.42 | 5.08 | 4.63 | 4.07 | 3.39 | 2.82 |
| 20 | 6.21 | 5.42 | 5.08 | 4.63 | 4.07 | 3.50 | 2.82 |
| 30 | 6.21 | 5.54 | 5.20 | 4.75 | 4.18 | 3.62 | 2.94 |

The above results are graphically presented in the Drawing, wherein torque is plotted along the y-axis and time along the x-axis of a Cartesian Coordinate system. It can be seen both from the Drawing and from Table II that as the mole proportion of free bisphenol AF decreases and the proportion of blocked bisphenol AF increases, the degree of cure of the vinylidene fluoride/hexafluoropropene elastomer at 177° C. decreases. A torque of about 2.25 N.m often is satisfactory for fluoroelastomer articles leaving fabricating equipment. The above data show that a satisfactory level of cure is obtained in all cases after 5 minutes.

EXAMPLE 5

This example shows that crude blocked bisphenol AF performs as well as the adsorbed product.

In several parallel runs, bisphenol AF was converted to its tetrahydropyranyl ether derivative by an acid-catalyzed reaction with dihydropyran, as outlined in Example 1, except that the relative mole proportions of the reactants were varied. Unchanged bisphenol was extracted with 10% aqueous NaOH; sometimes chloroform was added to a mixture prior to extraction. Volatile materials were removed at a reduced pressure, and the residue was dried in a vacuum oven at 100° C. The crude yield of the blocked derivatives was about 71-100%, but these products were fairly impure, as shown by their generally low melting points, although elemental analyses of some batches were close to the calculated values. These crude products were then used either alone or in mixtures with the corresponding unblocked bisphenol as curing agents for broad molecular range vinylidene fluoride/hexafluoropropene copolymer. Benzyltriphenylphosphonium chloride was the accelerator. The results are shown in Table III.

TABLE III

| | Run | | | | |
|---|---|---|---|---|---|
| | A | B | C | D | E |
| Compound | | | | | |
| Elastomer | 100 | 100 | 100 | 100 | 100 |
| Thermax[1] | 30 | 30 | 30 | 30 | 30 |
| Maglite D[2] | 3 | 3.6 | 3.6 | 3.6 | 3.6 |
| Ca(OH)$_2$ | 6 | 6 | 6 | 6 | 3 |
| Accelerator | 0.6 | 0.6 | 0.6 | 0.3 | 0.3 |
| Bisphenol AF | 2 | 1 | — | — | — |
| Crude blocked bisphenol AF, m.p. 40–47° C. | — | 1.5 | 3 | 3 | 3 |
| Mole % blocked bisphenol AF | 0 | 50 | 100 | 100 | 100 |
| [1]carbon black | | | | | |
| [2]magnesium Oxide | | | | | |
| Mooney Scorch (MS/121° C.) - Original | | | | | |
| Miminum | 36 | 36 | 36 | 36 | 34 |
| Min. to 5 point rise | 33 | 18 | 5 | 17 | 32 |
| Min. to 10 point rise | 41 | 20 | 6 | 21 | 40 |
| Points rise in 45 min. | 14 | — | — | — | 18 |
| Mooney Scorch (MS/121° C.), After 3 days at 38° C. and 100% Relative Humidity | | | | | |
| Minimum | 53 | 45 | 56 | 42 | 37 |
| Min. to 5 point rise | 5.5 | 4.7 | 2.5 | 8 | 13 |
| Min. to 10 point rise | 6.5 | 5.5 | 3.0 | 9 | 15 |
| ODR at 177° C., Torque (N.m) | | | | | |
| 2.5 min. | 0.45 | 0.56 | 1.36 | 0.45 | 0.34 |
| 5 min. | 0.79 | 8.13 | 3.84 | 2.71 | 0.79 |
| 7.5 min. | 11.86 | 8.59 | 4.07 | 2.82 | 3.16 |
| 10 min. | 12.31 | 8.70 | 4.07 | 2.94 | 3.39 |
| 15 min. | 12.43 | 8.70 | 4.18 | 3.05 | 3.50 |
| 20 min. | 12.43 | 8.70 | 4.18 | 3.16 | 3.62 |
| 30 min. | 12.43 | 8.81 | 4.29 | 3.28 | 3.73 |
| ODR at 204° C., Torque (N.m) | | | | | |
| 2.5 min. | 0.56 | 5.65 | 3.39 | 1.47 | 0.79 |
| 5 min. | 11.64 | 8.48 | 3.62 | 2.60 | 3.16 |
| 7.5 min. | 11.75 | 8.59 | 3.73 | 2.82 | 3.28 |
| 10 min. | 11.75 | 8.70 | 3.95 | 2.94 | 3.50 |
| 15 min. | 11.75 | 9.15 | 4.52 | 3.39 | 4.18 |
| 20 min. | 11.75 | 9.49 | 5.31 | 4.07 | 4.86 |
| 30 min. | 11.64 | 10.17 | 6.98 | 5.31 | 6.44 |

Stocks A-E were press-cured for 10 minutes at 177° C., then post-cured in an oven for 24 hours at 232° C. Physical properties of the cured elastomers were determined according to the following ASTM techniques:

| | |
|---|---|
| Modulus | D-412 |
| Tensile strength | D-412 |
| Elongation | D-412 |
| Hardness | D-2240 |
| Compression set | D-395 |

The results are presented in Table IV below.

TABLE IV

| | Run | | | | |
|---|---|---|---|---|---|
| | A | B | C | D | E |
| Original | | | | | |
| 100% Modulus, MPa | 5.6 | 5.1 | 4.5 | 4.0 | 3.6 |
| Tensile Strength at Break, MPa | 14.3 | 14.1 | 13.6 | 13.7 | 13.3 |
| Elongation at Break, % | 200 | 220 | 230 | 245 | 235 |
| Hardness, Durometer A | 72 | 71 | 70 | 67 | 66 |
| Aged 70 Hours at 276° C. | | | | | |
| 100% Modulus, MPa | 3.9 | 3.9 | 3.4 | 3.3 | 2.6 |
| Tensile Strength at Break, MPa | 10.6 | 9.9 | 8.6 | 9.5 | 9.6 |
| Elongation at Break, % | 230 | 240 | 245 | 260 | 280 |
| Hardness, Durometer A | 70 | 69 | 69 | 69 | 69 |
| Compression Set (B), 2.54 cm × 0.353 cm O-rings | | | | | |
| 70 hours at 200° C. | 18 | 24 | 24 | 24 | 18 |
| 70 hours at 232° C. | 35 | 47 | 46 | 49 | 46 |

EXAMPLE 6 p,p'-Isopropylidenediphenol (bisphenol A) was converted to its tetrahydropyranyl diether following the general procedure of Example 1 and was worked up in the same manner. The crude product, melting at 28°–32° C. was used without further purification. The performance of this blocked bisphenol as a curing agent was compared in parallel runs with that of similarly blocked, crude bisphenol AF, melting at 37°–38° C. The fluoroelastomer was a broad molecular weight copolymer of 60 parts of vinylidene fluoride and 40 parts of hexafluoropropene. In all cases, the compositions also contained 30 phr (parts by weight per 100 parts of elastomer) of Thermax carbon black and 3–3.5 phr of Maglite D magnesium oxide. Formulation and test data, based on 100 parts of elastomer, are given in Table V. The accelerator was benzyltriphenylphosphonium chloride.

TABLE V

| | Run | | | |
|---|---|---|---|---|
| | A | B | C | D |
| Component | | | | |
| Ca(OH)$_2$ | 6 | 6 | 6 | 3 |
| Accelerator | 0.6 | 0.6 | 0.6 | 0.3 |
| Bisphenol AF (6 millimoles) | 2 | — | — | — |
| Blocked bisphenol AF (6 millimoles) | — | 3 | — | — |
| Bisphenol A (9 millimoles) | — | — | 2 | — |
| Blocked bisphenol A (9 millimoles) | — | — | — | 3.6 |
| Mooney Scorch (MS/121° C.), Original | | | | |
| Minimum | 41 | 30 | 32 | 27 |
| Min. to 5 point rise | — | 15 | — | — |
| Min. to 10 point rise | — | 18 | — | — |
| Points rise in 45 min. | 1 | — | 0 | 1 |
| Mooney Scorch (MS/121° C.) After 3 Days at 38° C. and 100% Relative Humidity | | | | |
| Minimum | 50 | 36 | 41 | 32 |
| Min. to 5 point rise | 9 | 8 | 26 | 32 |
| Min. to 10 point rise | 11 | 9 | 37 | >45 |
| ODR at 177° C., Torque (N.m) | | | | |
| 2.5 min. | 0.34 | 0.45 | 0.34 | 0.23 |
| 5 min. | 0.45 | 5.1 | 0.23 | 0.23 |
| 7.5 min. | 10.2 | 5.3 | 0.34 | 0.23 |
| 10 min. | 12.3 | 5.4 | 0.79 | 0.23 |
| 15 min. | 12.4 | 5.5 | 11.9 | 0.34 |
| 20 min. | 12.4 | 5.6 | 12.3 | 0.79 |
| 30 min. | 12.4 | 5.6 | 12.4 | 3.4 |
| ODR at 204° C., Torque (N.m) | | | | |
| 2.5 min. | 0.34 | 4.0 | 0.34 | 0.34 |
| 5 min. | 12.4 | 5.3 | 6.8 | 0.34 |
| 7.5 min. | 12.7 | 5.4 | 11.1 | 0.57 |
| 10 min. | 12.7 | 5.5 | 11.2 | 2.1 |
| 15 min. | 12.7 | 6.1 | 11.2 | 4.9 |

TABLE V-continued

| | Run | | | |
|---|---|---|---|---|
| | A | B | C | D |
| 20 min. | 12.5 | 6.8 | 11.2 | 5.9 |
| 30 min. | 12.4 | 7.9 | 11.2 | 6.8 |

Stocks A-D were press-cured 10 minutes at 177° C., then post-cured in an oven for 24 hours at 232° C. Physical properties of the cured elastomers were determined according to established ASTM techniques. The results are given in Table VI.

TABLE VI

| | Run | | | |
|---|---|---|---|---|
| | A | B | C | D |
| Original | | | | |
| 100% Modulus, MPa | 5.4 | 5.6 | 6.2 | 4.9 |
| Tensile Strength at Break, MPa | 13.0 | 12.5 | 12.5 | 11.5 |
| Elongation at Break, % | 250 | 190 | 170 | 200 |
| Hardness, Durometer A | 72 | 72 | 76 | 77 |
| Aged 70 Hours at 276° C. | | | | |
| 100% Modulus, MPa | 3.8 | 5.0 | 5.6 | 4.6 |
| Tensile Strength at Break, MPa | 10.3 | 9.9 | 9.4 | 9.0 |
| Elongation at Break, % | 205 | 180 | 175 | 210 |
| Hardness, Durometer A | 72 | 70 | 75 | 77 |
| Compression Set (B), 2.54 cm × 0.353 cm O-rings | | | | |
| 70 hours at 392° F. | 18 | 24 | 30 | 46 |
| 70 hours at 450° F. | 38 | 33 | 49 | 65 |

The above results show that (1) cure with bisphenol A is slower than with bisphenol AF, and (2) cure with blocked bisphenol A at 177° C. is very low but at 204° C. it reaches an acceptable value after about 10 min. The maximum degree of cure reached with blocked bisphenol A at 204° C. is about one-half of that with free bisphenol A and comparable with the degree of cure obtained with blocked bisphenol AF. The physical properties of post-cured fluoroelastomer in all four runs are satisfactory for most fluoroelastomer applications. Desired properties can be obtained by using the blocked curing agents either alone or in mixtures with each other or with free bisphenols.

EXAMPLE 7

The performance of unsupported tetrahydropyranyl diether of bisphenol AF was compared with that of a preparation supported on Micro-Cel E ®, prepared as described in Example 1 and with that of a tetrahydropyranyl diether of hydroquinone made as described in Example 2. Equimolar amounts of vulcanizing agents were used in all runs. A 60:40 copolymer of vinylidene fluoride and hexafluoropropene was the elastomer. The following Table VII combines data from two separate experiments.

TABLE VII

| Component | Run | | | |
|---|---|---|---|---|
| | A | B | C | D |
| Elastomer | 100 | 100 | 100 | 100 |
| Thermax MT Black | 30 | 30 | 30 | 30 |
| Maglite D MgO | 3 | 3 | 3 | 3 |
| Calcium Hydroxide | 6 | 3 | 3.67 | 3.67 |
| Benzyltriphenylphosphonium chloride | 0.6 | 0.3 | 0.37 | 0.37 |
| Bisphenol AF | 2 | — | — | 0.6 |
| Blocked bisphenol AF | — | 3 | — | — |
| Blocked bisphenol AF on 30% Micro-Cel E ® | — | — | 4.29 | — |
| Blocked hydroquinone | — | — | — | 1.17 |
| Mooney Scorch (121° C.) | | | | |
| Minimum | 38.9 | 33.4 | — | — |
| Total Rise in 30 min. | 0.3 | 0.3 | — | — |
| ODR (30 min/177° C.) | | | | |
| Minimum torque (N.m) | 1.0 | 0.90 | 0.45 | 0.56 |
| Maximum torque (N.m) | 6.4 | 2.9 | 2.6 | 2.9 |

Stocks A-D were cured for 10 minutes at 177° C. and post-cured 24 hours at 232° C. Their physical properties are given in Table VIII.

TABLE VIII

| | Run | | | |
|---|---|---|---|---|
| | A | B | C | D |
| Shore A Hardness | 74 | 70 | 71 | 69 |
| Compression Set B (70 hr/232° C.) | | | | |
| Pellets | 44 | 46 | 42 | 47 |
| O-rings, 2.54 cm × 0.353 cm | — | — | 43 | 54 |
| Stress/Strain | | | | |
| 100% Modulus, MPa | 7.1 | 4.3 | 4.1 | 3.3 |
| 200% Modulus, MPa | — | — | — | 8.5 |
| Tensile Strength at Break, MPa | 11.9 | 10.8 | 10.1 | 11.0 |
| Elongation at Break, % | 150 | 190 | 200 | 250 |

It can be seen from the above data that blocked hydroquinone provides a sufficient degree of cure at 177° C. and gives vulcanized products having good physical properties when post-cured at 232° C.

EXAMPLE 8 n-Butyl vinyl ether-blocked hydroquinone prepared as described in Example 3 was evaluated in the same manner as described for other vulcanizing agents in Example 7. The formulation and test data are given in Table IX.

TABLE IX

| | Run | |
|---|---|---|
| | A | B |
| Elastomer | 100 | 100 |
| Thermax MT Black | 30 | 30 |
| Maglite D MgO | 3 | 3 |
| Calcium Hydroxide | 6 | 4 |
| Accelerator | 0.6 | 0.4 |
| Bisphenol AF | 2 | — |
| Blocked hydroquinone on 30% Micro-Cel E ® | — | 2.64 |
| ODR (30 min/177° C.) | | |
| Minimum Torque (N.m) | 1.0 | 1.6 |
| Maximum Torque (N.m) | 6.3 | 3.7 |
| Shore A Hardness | 74 | 69 |
| Compression Set B (70 hr/232° C.) | | |
| Pellets | 42 | 59 |
| O-rings, 2.54 cm × 0.353 cm | 39 | 72 |
| Stress/Strain | | |
| 100% Modulus, MPa | 4.9 | 2.8 |
| 200% Modulus, MPa | — | 6.4 |
| Tensile Strength at Break, MPa | 11.0 | 10.3 |
| Elongation at Break, % | 190 | 285 |

It can be seen from the above data that n-butyl vinyl ether-blocked hydroquinone is a good vulcanizing agent for fluoroelastomers.

EXAMPLE 9

Mold flow properties of vinylidene fluoride-hexafluoropropene compositions containing the tetrahydropyranyl diether of bisphenol AF were compared with mold flow properties of compositions of the same fluoroelastomer containing free bisphenol AF. For the broad molecular weight 60:40 copolymer, the tests were carried out by transfer molding into a "spider" mold, at 3.49, 6.90, 13.79, and 20.69 MPa through a 0.32 cm die for ten minutes at 177° C. For high viscosity 60:40 copolymer, the test was run at 20.69 MPa. In the tests with broad molecular weight copolymer about equal degree of mold filling was obtained for the following sample pairs.

| Bisphenol AF | Blocked Bisphenol AF |
|---|---|
| 20.7 MPa | 13.8 MPa |
| 13.8 MPa | 7.0 MPa |
| 6.9 MPa | 3.4 MPa |

Blocked bisphenol AF thus provides better flow properties of the composition because the same degree of mold filling is obtained at a lower pressure.

In the case of high viscosity polymer, the composition containing blocked bisphenol AF filled the mold more completely than the composition containing free bisphenol AF.

EXAMPLE 10

Recycling of Press-Cured Fluoroelastomer

Twenty weight percent of broad molecular weight 60:40 vinylidene fluoride/hexafluoropropene copolymer stock which had been press-cured 10 minutes at 177° C. using tetrahydropyran diether of bisphenol AF was mixed with uncured stock on a two-roll mill. The cured stock, in the form of 0.19 cm slabs, was first cut into pieces about 0.19×1.9×0.32 cm to facilitate mixing into uncured material. After 5-10 minutes on a mill with a tight nip and water cooling, the press-cured stock formed a smooth sheet which was fully dispersed in the uncured stock. This material 1st cycle) was then press-cured; the press-cured slabs were cut and dispersed as before at the same level in virgin stock (2d cycle), which was again press-cured. The procedure was repeated for the third time. Mill behavior in the third cycle was about the same as in the first, and the surface appearance of all three recycled stocks was similar and nearly as smooth as that of the original stock.

The compounding data and results are presented in Table X.

TABLE X

| Formulation | | | | |
|---|---|---|---|---|
| Elastomer | 100 | | | |
| Thermax MT Black | 30 | | | |
| Maglite D MgO | 3 | | | |
| Calcium Hydroxide | 3 | | | |
| Accelerator | 0.3 | | | |
| Vulcanizing agent | 3 | | | |
| | Original | Cycle 1 | Cycle 2 | Cycle 3 |
| Mooney Scorch (121° C.) | | | | |
| Minimum | 31.7 | 42.0 | 40.8 | 40.9 |
| Total Rise in 30 min. | 0.3 | 2.5 | 2.3 | 2.4 |
| ODR (30 min/177° C.) | | | | |
| Minimum Torque (N.m) | 0.68 | 0.79 | 0.79 | 0.79 |
| Maximum Torque (N.m) | 2.94 | 2.60 | 2.82 | 2.60 |

TABLE X-continued

| Shore A Hardness | 71 | 71 | 71 | 70 |
|---|---|---|---|---|
| Compression Set B (70 hr/232° C.) | | | | |
| Pellets | 43 | 44 | 41 | 43 |
| Stress/Strain | | | | |
| 100% Modulus, MPa | 4.4 | 4.0 | 3.7 | 4.9 |
| 200% Modulus, MPa | — | 10.9 | 10.5 | 12.2 |
| Tensile Strength at Break, MPa | 11.1 | 11.7 | 15.0 | 12.9 |
| Elongation at Break, % | 200 | 210 | 250 | 205 |

EXAMPLE 11

Evaluation of a blocked curing agent dispersion is fluoroelastomer

Bis (tetrahydropyranyl) ether of hydroquinone was adsorbed on hydrous calcium silicate to give a supported curing agent preparation containing 30% carrier and 70% active material. A portion of this supported preparation was dispersed in a copolymer of 60 parts of vinylidene fluoride and 40 parts of hexafluoropropene having a Mooney viscosity of 45. A copolymer of 60 parts of vinylidene fluoride and 40 parts of hexafluoropropene having a Mooney viscosity of 60 was compounded as shown in Table XI and subjected to ODR tests or press-cured and tested further. It is to be noted that in both runs A and B equimolar amounts of curing agents were used. The experimental data are given in Table XI.

TABLE XI

| | Run A | Run B |
|---|---|---|
| Component | | |
| Fluoroelastomer | 100 | 100 |
| Thermax MT Black | 30 | 30 |
| Maglite D MgO | 3 | 3 |
| Calcium Hydroxide | 3.67 | 3.67 |
| Benzyltriphenylphosphonium chloride | 0.37 | 0.37 |
| Bisphenol AF | 0.6 | 0.6 |
| Blocked Hydroquinone on Micro-Cel E® | 1.67 | — |
| Blocked Hydroquinone dispersion in fluoroelastomer | — | 4.8 |
| ODR at 177° C., Torque (N.m) | | |
| 2.5 min | 0.67 | 0.56 |
| 5 min | 1.92 | 1.69 |
| 7.5 min | 2.49 | 2.71 |
| 10 min | 2.71 | 2.94 |
| 15 min | 2.82 | 3.05 |
| 20 min | 2.82 | 3.05 |
| 30 min | 2.94 | 3.16 |
| Press-cured 10 min at 177° C., then post-cured 24 hrs at 232° C. Stress/Strain, Original | | |
| 100% Modulus, MPa | 3.1 | 3.3 |
| Tensile Strength at Break, MPa | 12.6 | 10.8 |
| Elongation at Break, % | 270 | 235 |
| Hardness, Durometer A | 73 | 73 |
| Aged 70 Hours at 276° C. | | |
| 100% Modulus, MPa | 2.2 | 2.5 |
| Tensile Strength at Break, MPa | 7.7 | 8.2 |
| Elongation at Break, % | 330 | 290 |
| Compression Set B (70 hrs/232° C.) | | |
| Pellets | 44 | 45 |
| O-rings (2.54 cm × 0.353 cm) | 63 | 62 |

The above results show that a dispersion of blocked aromatic polyhydroxy compound in fluoroelastomer is as effective a curing agent as the material alone.

EXAMPLE 12

Use of a fluoroelastomer which is a terpolymer, rather than a dipolymer.

In this example, the fluoroelastomer was a terpolymer of 45 parts of vinylidene fluoride, 30 parts of hexafluoropropene, and 25 parts of tetrafluoroethylene, having a Mooney viscosity of 80. The blocked curing agent was bis(tetrahydropyranyl) ether of bisphenol AF. The experimental conditions and results are given in Table XII.

TABLE XII

| | Run | |
|---|---|---|
| | A | B |
| Component | | |
| Elastomer | 100 | 100 |
| Thermax MT Black | 30 | 30 |
| Maglite D MgO | 3 | 3.5 |
| Calcium Hydroxide | 3 | 3 |
| Benzyltriphenylphosphonium Chloride | 1 | 0.5 |
| Bisphenol AF | 2 | — |
| Blocked curing agent | — | 3 |
| ODR at 177° C., Torque (N.m) | | |
| 2.5 min | 0.68 | 0.45 |
| 5 min | 1.02 | 0.90 |
| 7.5 min | 8.59 | 2.37 |
| 10 min | 10.51 | 2.82 |
| 15 min | 10.51 | 3.05 |
| 20 min | 10.51 | 3.28 |
| 30 min | 10.39 | 3.62 |
| Press-cured 10 min at 177° C., then post-cured 24 hrs at 232° C. | | |
| Stress/Strain, Original | | |
| 100% Modulus, MPa | 5.7 | 4.0 |
| Tensile Strength at Break, MPa | 14.7 | 15.6 |
| Elongation at Break, % | 230 | 260 |
| Hardness, Durometer A | 75 | 70 |
| Aged 70 Hours at 276° C. | | |
| 100% Modulus, MPa | 3.2 | 2.7 |
| Tensile Strength at Break, MPa | 10.5 | 10.1 |
| Elongation at Break, % | 350 | 320 |
| Hardness, Durometer A | 72 | 68 |
| Compression Set B, O-rings (2.54 × 0.353 cm) | | |
| 70 Hours at 200° C. | 26 | 36 |
| 70 Hours at 232° C. | 55 | 64 |

These results show that considerably lower torque values are obtained with the blocked curing agent than with free bisphenol AF; yet similar final cures are reached.

EXAMPLE 13

Effect of mole ratios of reactants in the preparation of blocked curing agent

Bis(tetrahydropyranyl) ether of bisphenol AF was prepared at three different reactant ratios. The product was used as curing agent for a copolymer of 60 parts of vinylidene fluoride with 40 parts of hexafluoropropene. The data are given in Table XIII.

TABLE XIII

| | Run | | |
|---|---|---|---|
| | A | B | C |
| Component | | | |
| Fluoroelastomer | 100 | 100 | 100 |
| Thermax MT Black | 30 | 30 | 30 |
| Maglite D MgO | 3 | 3 | 3 |
| Calcium Hydroxide | 3.67 | 3.67 | 3.67 |
| Benzyltriphenylphosphonium Chloride | 0.37 | 0.37 | 0.37 |
| Blocked bisphenol AF on 30% Micro-Cel E® | | | |
| Molar Ratio of dihydropyran to bisphenol 2.2:1 | 4.29 | — | — |
| 2.6:1 | — | 4.29 | — |
| 4.0:1 AF | — | — | 4.29 |
| ODR at 177° C., Torque (N.m) | | | |
| 2.5 min | 0.79 | 1.02 | 1.02 |
| 5 min | 2.26 | 2.26 | 2.15 |
| 7.5 min | 2.94 | 2.60 | 2.37 |
| 10 min | 3.05 | 2.71 | 2.37 |
| 15 min | 3.16 | 2.82 | 2.49 |
| 20 min | 3.16 | 2.94 | 2.60 |
| 30 min | 3.39 | 3.16 | 2.82 |

Because of the presence of some unblocked or incompletely blocked bisphenol AF in the preparations made at lower dihydropyran:bisphenol AF ratios, a higher degree of cure is reached with those preparations, as shown by higher torque.

EXAMPLE 14

This example shows the results obtained with n-butyl vinyl ether-blocked hydroquinone prepared at three different reactant ratios. The same fluoroelastomer as in Example 13 is used.

TABLE XIV

| | Run | | |
|---|---|---|---|
| | A | B | C |
| Component | | | |
| Fluoroelastomer | 100 | 100 | 100 |
| Thermax MT Black | 30 | 30 | 30 |
| Maglite D MgO | 3 | 3 | 3 |
| Calcium Hydroxide | 4 | 4 | 4.33 |
| Benzyltriphenylphosphonium chloride | 0.4 | 0.4 | 0.43 |
| Blocked Hydroquinone on 30% Micro-Cel E® | | | |
| Ether:hydroquinone mole ratio 4:1 | 2.64 | — | — |
| 2.1:1 | — | 2.64 | — |
| 1.05:1 | — | — | 2.64 |
| ODR at 177° C., Torque (N.m) | | | |
| 2.5 min | 1.81 | 1.58 | 1.24 |
| 5 min | 2.71 | 2.26 | 3.84 |
| 7.5 min | 3.16 | 3.05 | 5.08 |
| 10 min | 3.39 | 3.39 | 5.31 |
| 15 min | 3.50 | 3.73 | 5.54 |
| 20 min | 3.61 | 3.84 | 5.65 |
| 30 min | 3.73 | 3.95 | 5.76 |

It can be seen again that at lower reactant ratios, less complete substitution is obtained and a higher degree of cure results.

EXAMPLE 15

Work-up of a blocked curing agent made at a low reactant ratio.

Even with a 1.05:1 dihydropyran:bisphenol AF ratio, some fully blocked bipsphenol AF is obtained, together with some monosubstituted bisphenol AF and free, unchanged bisphenol AF. Because of a large proportion of free bisphenol AF in the crude product, it is advisable to carry out purification by extraction with base. Mere neutralization is not satisfactory. This is shown in Table XV.

TABLE XV

| | Run | | |
|---|---|---|---|
| | A | B | C |
| Component | | | |
| Fluoroelastomer | 100 | 100 | 100 |
| Thermax MT Black | 30 | 30 | 30 |
| Maglite D MgO | 3 | 3 | 3 |

TABLE XV-continued

| | Run | | |
|---|---|---|---|
| | A | B | C |
| Calcium Hydroxide | 6 | 4 | 1.67 |
| Benzyltriphenylphosphonium Chloride | 0.6 | 0.4 | .17 |
| Bisphenol AF | 2 | — | — |
| Blocked Bisphenol AF (1.05:1.0) | | | |
| Neutralization | — | 3 | — |
| Aqueous Base Extraction | — | — | 3 |
| ODR at 177° C., Torque (N.m) | | | |
| 2.5 min | 0.79 | 0.68 | 0.79 |
| 5 min | 5.54 | 1.47 | 1.24 |
| 7.5 min | 5.87 | 4.97 | 1.81 |
| 10 min | 5.99 | 5.20 | 2.03 |
| 15 min | 5.99 | 5.20 | 2.26 |
| 20 min | 5.99 | 5.31 | 2.37 |
| 30 min | 6.10 | 5.31 | 2.49 |
| Press-cure 10 min at 177° C. and post-cure 24 hrs at 232° C. | | | |
| Compression Set (B) (70 hr/232° C.) | | | |
| Pellets | 44 | 41 | 28 |
| Stress/Strain | | | |
| 100% Modulus, MPa | 5.5 | 5.9 | 3.3 |
| Tensile Strength at Break, MPa | 11.2 | 10.6 | 12.9 |
| Elongation at Break, % | 180 | 180 | 250 |
| Hardness, Durometer A | 72 | 75 | 66 |

The best workability at 177° C. was obtained in run C, as shown by ODR. Fully cured product was equivalent to those of runs A and B. The product of run C had an exceptionally good compression set value.

EXAMPLE 16

Hot tensile properties

This example shows that fluoroelastomers press-cured at 177° C. according to this invention have very good elongation at break at the press-cure temperature. This very good hot elongation permits easy demolding without tearing. The compounding and test data are given in Table XVI. Bis(tetrahydropyranyl) ether of bisphenol AF was used in each pair of runs (A-B and C-D) in equimolar quantities.

TABLE XVI

| | Control A | Run B | Control C | Run D |
|---|---|---|---|---|
| Formulation | | | | |
| Fluoroelastomer A[1] | 100 | 100 | — | — |
| Fluoroelastomer B[2] | — | — | 100 | 100 |
| Thermax MT Black | 30 | 30 | 30 | 30 |
| Maglite D | 3 | 3 | 3 | 3 |
| Calcium Hydroxide | 6 | 3 | 6 | 3 |
| Benzyltriphenylphosphonium chloride | 0.45 | 0.23 | 0.6 | 0.3 |
| Bisphenol AF | 1.4 | — | 2 | — |
| Blocked bisphenol AF | — | 2.3 | — | 3 |
| Stress/Strain at 177° C. | | | | |
| (10 min/177° C. press cure only) | | | | |
| 100% Modulus, MPa | 3.72 | 1.52 | — | 0.55 |
| Tensile Strength at Break, MPa | 4.0 | 3.21 | 3.10 | 1.03 |
| Elongation at Break, % | 105 | 240 | 70 | 210 |

[1] 1. 60:40 copolymer of vinylidene fluoride:hexafluoropropene with Mooney viscosity 155.
[2] 60:40 copolymer of vinylidene fluoride:hexafluoropropene with Mooney viscosity 60.

We claim:
1. A vulcanizable highly fluorinated fluoroelastomer composition comprising
(A) a copolymer of vinylidene fluoride with at least one other ethylenically unsaturated fluoromonomer,
(B) an accelerator effective in promoting the crosslinking of copolymer (A) with an aromatic polyhydroxy compound in a weakly basic system,
(C) a substance selected from the group consisting of divalent metal oxides, divalent metal hydroxides, and a mixture of such oxides or hydroxides with metal salts of weak acids, and
(D) a blocked vulcanizing agent for copolymer (A) consisting of an acetal or thioacetal obtained by an acid catalyzed reaction of an appropriate vinyl ether or thioether with a polyhydroxylic compound selected from the group consisting of di-, tri-, and tetrahydroxybenzenes, -naphthalenes, and -anthracenes; and bisphenols; all the above compounds being unsubstituted or substituted with chlorine, bromine, fluorine, carboxyl, or acyl; and 2,4-dihydroxybenzophenone;

the vinyl ether or thioether having the following formula (1):

wherein
Z is O or S;
R[1] can be hydrogen; each of R[1] and R[2] independently can be a $C_1$–$C_{18}$ alkyl, phenyl or substituted phenyl, a $C_5$–$C_7$ cycloalkyl or substituted cycloalkyl, a $C_3$–$C_8$ alkenyl, a $C_3$–$C_8$ alkynyl, or a $C_5$–$C_7$ cycloalkenyl;
when at least one of R[1] and R[2] is substituted phenyl or substituted cycloalkyl, their substituents being selected from the group consisting of $C_1$–$C_6$ alkyl, halogen, and $C_1$–$C_6$ alkoxy groups; or R[1] and R[2] can be joined together, the above compound of formula (1) being a ring having 5–7 members, which may be unsubstituted or substituted; if the ring is substituted, the substituents being selected from the same groups as those recited above for R[1] and R[2] other than hydrogen;

provided that when R[1] and R[2] are not joined together, Z can only be O.

2. A composition of claim 1 wherein the acetal or thioacetal is based on a polyhydroxylic aromatic compound selected from bisphenol A, bisphenol AF, hydroquinone, and 2,4-dihydroxybenzophenone.

3. A composition of claim 2 wherein the acetal is based on dihydropyran or on n-butyl vinyl ether.

4. A composition of claim 3 wherein the acetal is the tetrahydropyranyl diether of bisphenol AF, bisphenol A, or hydroquinone.

5. A vulcanizable composition of claim 1 wherein in addition to the acetal or thioacetal of a polyhydroxylic aromatic compound a free polyhydroxylic aromatic compound also is present.

6. A vulcanizable composition of claim 1 wherein the fluoroelastomer is a copolymer of vinylidene fluoride with hexafluoropropene.

7. A vulcanizable composition of claim 1 wherein the fluoroelastomer is a terpolymer of vinylidene fluoride, hexafluoropropene, and tetrafluoroethylene.

8. A vulcanizable composition of claim 6 wherein the blocked vulcanizing agent is tetrahydropyranyl diether of bisphenol AF, and this blocked vulcanizing agent is mixed with free bisphenol AF.

9. A vulcanizable composition of claim 6 wherein the blocked vulcanizing agent is tetrahydropyranyl diether of hydroquinone, and this blocked vulcanizing agent is mixed with bisphenol AF.

10. In a process for vulcanizing a highly fluorinated vinylidene fluoride copolymer with at least one other fluorinated, ethylenically unsaturated monomer by crosslinking with an aromatic polyhydroxy compound in the presence of an accelerator in a weakly basic system at about 163°–204° C., the improvement consisting in that the hydroxyl groups of at least a portion of the crosslinking compound are first blocked by acid-catalyzed conversion to acetal or thioacetal groups, the blocking agent having the following formula (1):

(1)

wherein

Z is O or S;

$R^1$ can be hydrogen; each of $R^1$ and $R^2$ independently can be a $C_1$–$C_{18}$ alkyl, phenyl or substituted phenyl, a $C_5$–$C_7$ cycloalkyl or substituted cycloalkyl, a $C_3$–$C_6$ alkenyl, a $C_3$–$C_8$ alkynyl, or a $C_5$–$C_7$ cycloalkenyl;

when at least one of $R^1$ and $R^2$ is substituted phenyl or substituted cycloalkyl, their substituents being selected from the group consisting of $C_1$–$C_6$ alkyl, halogen, and $C_1$–$C_6$ alkoxy groups; or $R^1$ and $R^2$ can be joined together, the above compound of formula (1) being a ring having 5–7 members, which may be unsubstituted or substituted; if the ring is substituted, the substituents being selected from the same groups as those recited above for $R^1$ and $R^2$ other than hydrogen;

provided that when $R^1$ and $R^2$ are not joined together, Z can only be O.

11. The improvement of claim 10 wherein the copolymer is a copolymer of vinylidene fluoride with hexafluoropropene.

12. The improvement of claim 10 wherein the copolymer is a terpolymer of vinylidene fluoride with hexafluoropropene and tetrafluoroethylene.

13. The improvement of claim 11 wherein the crosslinking compound is bisphenol AF, bisphenol A, hydroquinone, or dihydroxybenzophenone, at least a portion of the hydroxyl groups of the crosslinking compound being converted to an acetal.

14. The improvement of claim 13, wherein both hydroxyl groups of the crosslinking agents are converted to tetrahydropyranyl ether groups.

15. A composition consisting essentially of an unvulcanized highly fluorinated copolymer of vinylidene fluoride with at least one other fluorinated, ethylenically unsaturated monomer having dispersed therein a blocked vulcanizing agent for said unvulcanized copolymer, said blocked vulcanizing agent consisting of an acetal or thioacetal obtained by an acid catalyzed reaction of an appropriate vinyl ether or thioether with a polyhydroxylic compound selected from the group consisting of di-, tri-, and tetrahydroxybenzenes, -naphthalenes, and -anthracenes; and bisphenols; all the above compounds being unsubstituted or substituted with chlorine, bromine, fluorine, carboxyl, or acyl; and 2,4-dihydroxybenzophenone;

the vinyl ether or thioether having the following formula (1):

(1)

wherein

Z is O or S;

$R^1$ can be hydrogen; each of $R^1$ and $R^2$ independently can be a $C_1$–$C_{18}$ alkyl, phenyl or substituted phenyl, a $C_5$–$C_7$ cycloalkyl or substituted cycloalkyl, a $C_3$–$C_8$ alkenyl, a $C_3$–$C_8$ alkynyl, or a $C_5$–$C_7$ cycloalkenyl;

when at least one of $R^1$ and $R^2$ is substituted phenyl or substituted cycloalkyl, their substituents being selected from the group consisting of $C_1$–$C_6$ alkyl, halogen, and $C_1$–$C_6$ alkoxy groups; or $R^1$ and $R^2$ can be joined together, the above compound of formula (1) being a ring having 5–7 members, which may be unsubstituted or substituted; if the ring is substituted, the substituents being selected from the same groups as those recited above for $R^1$ and $R^2$ other than hydrogen;

provided that when $R^1$ and $R^2$ are not joined together, Z can only be O;

said acetal or thioacetal constituting up to about 50 weight percent of the total dispersion.

16. The composition of claim 15 wherein the acetal or thioacetal is selected from the group consisting of derivatives of bisphenol A, bisphenol AF, hydroquinone, and 2,4-dihydroxybenzophenone.

17. The composition of claim 16 wherein the acetal is based on dihydropyran or n-butyl vinyl ether.

* * * * *

UNITED STATES PATENT OFFICE
CERTIFICATE OF CORRECTION

PATENT NO. : 4,177,223
DATED : December 4, 1979
INVENTOR(S) : Richard J. Arhart and Arthur Nersasian It is certified that error appears in the above-identified patent and that said Letters Patent are hereby corrected as shown below:

Column 21, line 30, "a $C_3$-$C_6$ alkenyl" should read -- a $C_3$-$C_8$ alkenyl --; and Column 22, line 2, "agents" should read -- agent --.

Signed and Sealed this

Twenty-ninth Day of July 1980

[SEAL]

Attest:

SIDNEY A. DIAMOND

Attesting Officer     Commissioner of Patents and Trademarks